United States Patent [19]

Frank

[11] Patent Number: 4,798,245

[45] Date of Patent: Jan. 17, 1989

[54] METHOD OF TREATING HETEROGENEOUS FORMATION WITH POTASSIUM HYDROXIDE

[75] Inventor: Jeffrey E. Frank, Rockford, Ill.

[73] Assignee: Marathon Oil Company, Findlay, Ohio

[21] Appl. No.: 94,194

[22] Filed: Sep. 3, 1987

[51] Int. Cl.$^4$ .............................................. E21B 43/12
[52] U.S. Cl. .................................. 166/281; 166/292; 166/305.1
[58] Field of Search ..................... 166/281, 292, 305.1, 166/273, 274, 370; 405/263; 252/8.551; 106/900

[56] References Cited

U.S. PATENT DOCUMENTS

| | | | |
|---|---|---|---|
| 3,055,423 | 9/1962 | Parker | 166/292 X |
| 3,618,665 | 11/1971 | Fulford | 166/281 X |
| 3,701,384 | 10/1972 | Routson et al. | 166/270 X |
| 4,280,560 | 7/1981 | Sydansk | 166/305.1 |
| 4,284,140 | 8/1981 | Sydansk et al. | 166/305.1 X |
| 4,369,843 | 1/1983 | Mondshine | 166/305.1 X |
| 4,570,710 | 2/1986 | Stowe | 166/250 |
| 4,572,297 | 2/1985 | Thigpen, Jr. et al. | 166/307 |
| 4,621,692 | 11/1986 | Mondshine | 166/292 X |
| 4,625,802 | 12/1986 | Sydansk | 166/292 |
| 4,673,040 | 6/1987 | Sydansk | 166/305.1 |

*Primary Examiner*—George A. Suchfield
*Attorney, Agent, or Firm*—Jack L. Hummel; Rodney F. Brown

[57] ABSTRACT

Solid KCl is present in the front portion of KOH treatment solution to facilitate placement of the solution in low permeability zones of a subterranean formation wherein KOH treatment is desired. The solid KCl temporarily plugs the high permeability zones enabling the KOH solution to enter the low permeability zones. After a period of time the solid dissolves in situ restoring permeability to the formation.

25 Claims, No Drawings

METHOD OF TREATING HETEROGENEOUS FORMATION WITH POTASSIUM HYDROXIDE

BACKGROUND OF THE INVENTION

1. Technical Field:

Heterogeneous formations are treated with potassium hydroxide by injecting into the more permeable strata of the formations an aqueous mixture containing solid potassium chloride followed by a concentrated potassium hydroxide solution.

2. Prior Art:

Sandstone formations containing fine particles can be damaged when such particles come in contact with an aqueous solution containing an ionic makeup different from that of the connate waters. Such can cause permeability reduction and reduce the flow of fluids to both injection wells and production wells. This phenomenon is especially prevalent in formations wherein the waters are becoming fresher. The "fine" particles are not limited to clays but include all swelling and potentially mobile fine particles within the sandstone pore bodies. Examples of such fine particles include clay minerals, large surface area silica ($SiO_2$) minerals, feldspars, mica and barite.

Encroachment of the fresher waters in the formation can occur by an underlying aquifer, by enhanced oil recovery processes, by fluids used to treat near wellbore conditions, and the like instances. Swellable clays, such as montmorillionite having interstitial layers, swell when contacted with the fresher waters causing a reduction in permeability. Also, migratable clays, such as poorly cemented kaolinite and illite clay particles, can become detached from the sandstone formation during the flow of fresh water therethrough and can become trapped in the formation pore-throat openings reducing permeability and the flow of fluids therethrough. Often, encroachment of fresher brines into a formation containing clays results in occurrence of both types of permeability damage.

To overcome the above problem, U.S. Pat. No. 4,280,560 teaches the use of potassium hydroxide to stabilize sandstone formations containing water-sensitive fine particles. The potassium hydroxide interacts with the fine particles to render the particles immobile by permanently altering the silicate chemistry of the clays, thereby rendering them insensitive to fresh brines.

Treatment of stratified sandstone formation presents another problem. That is, treatment of such formations with the above technology can thieve the potassium hydroxide into the more permeable zones, leaving the less permeable zones untreated. A diverting fluid that is compatible with the formation and the potassium hydroxide treatment is needed. The diverting fluid should not have an adverse affect on the formation to be treated with KOH treatment and should permit a uniform treatment of the different permeable zones in the formation.

SUMMARY OF THE INVENTION

Treatment of injection and production wells in heterogeneous sandstone formations is accomplished by using solid potassium chloride as the diverting agent. The solid potassium chloride is carried in a substanailly non-solubilizing medium. Thereafter an aqueous potassium hydroxide solution containing at least 10% potassium hydroxide by weight and more preferably at least 15% is injected. The concentration of the potassium hydroxide in the aqueous solution and the conditions prevailing within the formation should be such that the solution will not cause a significant amount of the previously injected potassium chloride solid to be solubilized in the aqueous potassium hydroxide solution.

An aqueous presoak solution can be injected before the solid potassium chloride. In addition, a spacer slug can be injected before injection of the solid potassium chloride and the aqueous potassium hydroxide solutions. The spacer slug should be substantially inert to the solid potassium chloride, that is it should not substantially solubilize an appreciable amount of the solid potassium chloride into the spacer slug.

DESCRIPTION OF THE INVENTION

Production and injection wells traversing heterogeneous sandstone formations wherein the wells are damaged by water-sensitive clays, more particularly, migratable fine particles, are treated by this invention. The migratable fine particles generally become detached from the sandstone formation during the flow of fresher brines through the formation causing the particles to become entrapped in pore-throat openings of the formation resulting in permeability reduction. Such particles include clay minerals, large surface area silica ($SiO_2$) minerals, feldspars, mica and barite as well as clays which are sensitive to swelling due to a change in the ionic properties of connate waters.

The heterogeneous formations are characterized as containing at least two substantially different permeability strata within the formation. More particularly this invention is applicable with those formations wherein one strata has a permeability substantially greater than the other strate-the more permeable strata thieving the injected potassium hydroxide solution as the well is being treated.

The two or more different strata within the formation have permeability difference of at least about 10 md and preferably at least about 100 md or more. The permeability differennces between the strata are sufficiently large to thieve a substantial portion of the injected aqueous potassium hydroxide into the larger permeability strata and thus deprive the lesser permeability zones of treatment.

It is preferred that the process be carried out by first injecting an aqueous dilute potassium chloride solution into the formation. This acts as a presoak to condition the formation by causing the clays to assume the smallest stabilized volume. About 100 to about 10,000 and preferably 500 to about 5,000 and more preferably about 2,500 pounds of KCl per porosity foot is injected as the presoak solution. For purposes of this invention, porosity foot is defined as the linear depth of the wellbore multiplied by the percent porosity of average percent porosity of the reservoir rock. Thus, one porosity foot is equal to 10 vertical feet of porosity rock multiplied by 10% porosity. The aqueous water used to dissolve the potassium chloride is water preferably containing less than about 10 ppm of divalent cation salts and more preferably less than about 1 ppm of such salts. The potassium chloride can be present in the water at concentrations of greater than 0.1% and up to the saturation point of the potassium chloride in the water, but preferably is about 1 to about 20 and more preferably about 2 to about 10 wt %.

The presoak solution also acts as a spacer between the connate divalent cations and the subseuently injected solid potassium chloride. If the divalent cations are permitted to come in contact with the subsequently injected potassium hydroxide, undesirable precipitates can form which can adversely affect the treatment.

The presoak solution can contain other salts providing the salts are non-damaging to the treatment and are compatible with the water-sensitive clays within the formation. Sodium chloride is not desirable since it tends to swell or expand the clays to adversely affect the treatment. Potassium chloride on the other hand does not swell or expand the clays and thus is compatible with the process.

The presoak solution is preferably about 1 to about 20 wt % and preferably about 2 to about 10 times the volume of the subsequentlyinjected potassium hydroxide solution.

Sufficient amounts of the solid potassium chloride are injected into the stratified formation to substantially reduce the permeability of the high permeability strata within the formation. Indication of sufficient potassium chloride is realized on the surface by an increase in surface pressure of the well.

The solid potassium chloride is injected into the more permeable strata in concentrations sufficient to divert subsequentlyinjected potassium hydroxide solution into the lesser-permeable strata. The potassium chloride is preferably void of any by-product that may adversely react with the subsequently-injected potassium hydroxide or with the water sensitive clays. The carrier fluid for the solid potassium chloride is preferably one that will not solubilize an appreciable portion, i.e., not more than 50% by weight, of the potassium chloride. It can be a saturated potassium chloride solution or a highly-concentrated potassium hydroxide solution. Any carrier fluid that is compatible with the sandstone formation and which will not solubilize an appreciable amount of potassium chloride is useful.

The amount of solid potassium chloride to be injected depends on the degree of stratification of the formation and the permeability of the high permeable zones. For example, if the formation is highly stratified and if the more permeable strata of the formation has a permeability greater than 100 md, then the amount of injected potassium chloride should be at least about 100 and more preferably at least about 1,000 lbs/porosity foot.

Particle size and distribution of the particle size of the solid potassium chloride is dependent upon the permeability of the stratified formation. For general application, the particle size can be within the range of about 2 to about 200 Tyler Screen Mesh and is preferably about 10 to about 100 mesh. However, within the broad range of 2-200 mesh, it is preferred that about 20% of the particles pass through a 30 mesh and 50% pass through a 50 mesh. If the average permeabilities of the formation are relatively small, e.g., within the range of 1 to 100 md, then the average particle size of the potassium chloride can be about 30 to about 75 mesh. When the permeability of the high permeability strata of the formation is greater than 100 md, the potassium chloride can be injected in the presence of a chemical to cause the potassium chloride to agglomerate or to fuse into larger particles. The agglomerated particles can be prepared on the surface and then injected. A suitable agglomerating agent is cationic polyacrylamide. A suitable fusing agent is aqueous potassium chloride solution at a concentration greater than 20 wt %—concentration less than 20% doe not exhibit the desired properties.

Also, the solid potassium chloride can be injected into the highly stratified formation by dispersing it in an aqueous medium containing a viscosity increasing agent, such as a partially hydrolyzed polyacrylamide, polyacrylamide, polysaccharides, and like viscosity increasing agents. However, the aqueous medium is preferably one that will not solubilize an appreciable portion of the solid potassium chloride, e.g., it can be a saturaed potassium chloride solution containing the viscosity increasing agent. In addition, the solid potassium chloride can be dispersed in a hydrocarbon, e.g., diesel fuel, kerosene, crude oil, etc.

The solid potassium chloride can also be dispersed in the front portion of the aqueous potassium hydoxide solution, the potassium hydroxide being present in the aqueous medium in concentrations such that it will not solubilize an appreciable portion of the potassium chloride.

After the permeability of the highly permeable strata within the formation is substantially reduced, the potassium hydroxide solution is injected. The concentration of potassium hydroxide within the solution can be graded such that the front end of the solution contains highly-concentrated potassium hydroxide and the rear end is a dilute potassium hydroxide solution that tends to solubilize the previously-injected solid potassium chloride into solution. That is, as the potassium hydroxide concentration of the solution decreases, the solution tends to solubilize more readily the previously-injected potassium chloride.

The aqueous potassium hydroxide solution to be injected should have a potassium hydroxide concentration such that it will not solubilize an appreciable amount of the potassium chloride it may contact. Concentratins greater than 10% and preferably greater than 15% and more preferably greater than 30% up to the saturation point of the potassium hydroxide in the aqueous solution are useful. About 100 to about 100,000 and preferably about 500 to about 50,000 and more preferably about 1,000 to about 10,000 pounds/porosity foot of potassium hydroxide is injected into the formation. The potassium hydroxide is dissolved in an aqueous solution preferably containing no divalent cations and more preferably less than about 1,000 ppm of sodium salts. There should not be present divalent cations within the water such that the cations could cause a substantial amount of precipitation of the potassium hydroxide.

The potassium hydroxide is preferably injected radially out into the formation to an average distance of at least about 5 feet and preferably about 15 feet and more preferably to an average distance of at least 25 feet; however, the desired radial distance away from the wellbore will depend upon the extent of formation damage. Also it is recognized that the radial flow of the potassium hydroxide out into the formation will not be uniform, but it is preferred that the minimum average distance that the potassium hydroxide is injected out into the formation is within the above ranges.

It is important that once the injection of the aqueous potassium hydroxide solution is started into the formation that it be continuous. Preferably the rate of injection for an average well is about 2 to about 20 barrels per hour and more preferably about 4 to about 8 barrels per hour. However, such rate will depend on the permeability of the formation to be treated and the degree of stratification of the formation. The rate will also depend upon the thickness of the formation to be treated. For example if the formation to be treated is 50 feet thick and the formation is comprised of substantially two different permeability strata that have a permeability difference of about 1,000 md, about 8 to about 20 barrels per hour can be injected providing the permeability of the lesser permeability strata is at least about 100 md. However if the permeability is less than about 100 md, the rate of injected potassium hydroxide solution can be about 2 to about 4 barrels per hour. If injection is stopped, there is a possibility that connate water will backflow from the formation and mix with the potassium hydroxide and cause precipitation to form. Such precipitation would have an adverse affect on the treatment.

A displacing fluid can be injected after the aqueous potassium hydroxide solution to displace the potassium hydroxide out into the formation to be treated. The displacing fluid is one compatible with the aqueous hydroxide solution and is preferably water containing no divalent cations. If divalent cations are present, the divalent cations are not in sufficient concentration to cause adverse peremability damage due to precipitation between the divalent cations and the hydroxide ion. A gas such as nitrogen or carbon dioxide or any inert gas can be used to displace the potassium hydroxide out into the formation. A weak inorganic acid, such as 7½% HCl, can also be used; such has the advantage of converting the trailing edge of the potassium hydroxide solution to potassium chloride which in turn enhances the treatment. Also, the weak acid tends to dissolve iron precipitates and solubilize carbonates which may be present.

It is preferred that the potassium hydroxide be displaced out of the wellbore into the formation such that a substantial amount of the clay-sensitive areas are contacted with the potassium hydroxide. Thereafter, the well is shut in and the "fine" particles are permitted to remain in contact with the potassium hydroxide for approximately 4 to about 64 hours and more preferably 8 to about 48 hours and most preferably for at least about 16 hours. Sufficient time should be given to permit the potassium hydroxide to "permanently" alter the silicate chemistry of the clays and render them insensitive to the fresh brines.

Thereafter, the well is returned to normal operations. Increased relative permeability to the flow of water is realized.

PREFERRED EMBODIMENT OF THE INVENTION

The preferred embodiment of this invention is to use a saturated potassium hydroxide aqueous solution as the carrier for the solid potassium chloride. Sufficient amounts of the solid potassium chloride are then injected to reduce the permeability of the highly permeable strata. Thereafter, the aqueous potassium hydroxide, without the solid potassium chloride, is injected-the previously injected potassium chloride reduces the permeability of the highly-permeable strata causing the potassium hydroxide to enter the lesser permeability strata in the sandstone formation in the near wellbore area. The tail end of the potassium hydroxide solution preferably has a sufficiently low potassium hydroxide concentration such that the previously injected potassium chloride tends to solubilize into the potassium hydroxide solution, thus causing the potassium hydroxide to flow out of the highly permeable strata.

The following examples are presented to teach specific embodiments of the invention.

EXAMPLE 1

Three potassium hydroxide solutions are prepared. The water used in preparing the solutions is void of divalent cations and contains about 1,000 ppm of monovalent cations. The potassium hydroxide is present in concentrations of 15%, 30% and 45% by weight. These solutions are analyzed for chloride, known to be an impurity in the potassium hydroxide. Thereafter, 20 grams of reagent-grade potassium chloride are added to 100 grams of each solution. The solutions are allowed to mix over a two-day period to give sufficient time for any ionic exchange and/or solubilization to take place. Observation of these solutions indicate that the 15% potassium hydroxide solution contains no precipitate, the 30% potassium hydroxide solution contains some precipitate and the 45% potassium hydroxide solution contains a large amount of precipitate. The precipitate from the 30 and 45% potassium hydroxide solutions are filtered, dried in an oven and then weighed. All three aqueous solutions are analyzed for chloride and pH. The precipitate from the 45% and 30% potassium hydroxide solutions are tested for solubility by adding 1 gram precipitate to 100 grams of deionized water. The solubility test is repeated with 15% potassium hydroxide. The two solutions containing deionized water with precipitate in them are analyzed for chloride and hydroxide. These analyses given an indication of the potassium hydroxide versus potassium chloride concentration in the solution and in the precipitate. The data in Table 1 show that the potassium hydroxide tends to remain in solution while the potassium chloride is the predominant component in the precipitate. Also, the precipitate from both the 45% and 30% solutions did redissolve in both dionized water and 15% potassium hydroxide solution The results are illustrated in Table 1:

TABLE 1

HIGH CONCENTRATION KOH/KCl SOLUTION STABILITY INFORMATION FOR FLUID DIVERSION

| | INITIAL KOH SOLUTIONS | | | SOLUTION AFTER ADDING 20 G KCl AND STIRRING 72 HOURS | | | |
|---|---|---|---|---|---|---|---|
| KOH CONC. WT. % | CHLORIDE MG/L ANALYZED | HYDROXIDE MG/L KNOWN | pH-CALC. FROM HYDROXIDE CONC. | CHLORIDE MG/L ANALYZED | pH CALC. FROM HYDROXIDE CONC. | pH ANALYZED | AMT. PPT, G, DRIED |
| 45% | 350 | 136,364 | 14.90 | 13,550 represents 2.8% KCl | 178,011 represents 58.7% KOH | 15.02 | 28.1178 28 g contain 22.2 g KCl + 1.57 g KOH |
| 30% | 250 | 90,909 | 14.73 | 40,550 represents 8.5% KCl | 53,759 represents 17.7% KOH | 14.50 | 9.4838 9.5 g contains 8.6 g |

TABLE 1-continued
HIGH CONCENTRATION KOH/KCl SOLUTION STABILITY INFORMATION FOR FLUID DIVERSION

| 15% | 125 | 45,455 | 14.43 | 14,150* represents 9.9% KCl | 17,396 represents 5.7% KOH | 14.01 | KCl + 0.25 g KOH 0. |
|---|---|---|---|---|---|---|---|

| INITIAL KOH SOLUTIONS | | | | PRECIPITATE | | | |
|---|---|---|---|---|---|---|---|
| KOH CONC. WT. % | CHLORIDE MG/L ANALYZED | HYDROXIDE MG/L KNOWN | pH-CALC. FROM HYDROXIDE CONC. | SOLUBILITY** IN D.I.W. | IN 15% KOH | ANALYSIS OF 1 G PPT IN 100 G DEIONIZED WATER (DIW) CHLORIDE/KCl CALC. | HYDROXIDE/KCl CALC. |
| 45% | 350 | 136,364 | 14.90 | S | S | 3760/7901 1 g ppt contains .7901 g KCl (79% KCl) | 170/561 1 g ppt contains .0561 g KOH (5.6% KOH) |
| 30% | 250 | 90,909 | 14.73 | S | S | 4320/9078 1 g ppt contains .9078 g KCL (91% KCl) | 80/264 1 g ppt contains .0264 g KOH (2.6% KOH) |
| 15% | 125 | 45,455 | 14.43 | — | — | | |

*Chloride concentration of 9.09% KCl solution should have been approximately 43,256 mg/l, so value is reasonable especially since solution was made wt/wt, but was analyzed wt/vol, this would account for a higher analytical reading.
**1 g precipitate dropped into aqueous solution dried, then stirred.
Definitions: "MG" = milligrams;
"L" = liter;
"G" and "g" = gram;
"PPT" and "ppt" = precipitate.

EXAMPLE 2

A highly-stratified sandstone formation is characterized as having a permeability stratum of about 100 md, 15% porosity and an average thickness of 5 feet and a lesser permeability stratum of about 10 md, 12% porosity and an average thickness of about 15 feet. About 2,000 pounds/porosity foot of a 3% by weight potassium chloride dissolved in fresh water is injected. The total volume of presoak solution injected is about 1,650 barrels. Thereafter, 100 pounds/porosity foot of solid potassium chloride is injected—20% of the KCl is larger than 35 mesh and 68% is larger than 60 mesh. The carrier fluid for the solid potassium chloride is a saturated potassium chloride aqueous solution. Before injection of the solid potassium chloride the surface pressure of the well is about 1,600 psi and after injection the surface pressure is about 2,200 psi. Thereafter 10,000 pounds/porosity foot of potassium hydroxide disolved in fresh water is injected, the concentration of the potassium hydroxide solution is followed by sufficient water to displace the potassium hydroxide out of the wellbore. The well is shut in for 16 hours, and then returned to operation. An increased injectivity of about 20% is realized.

EXAMPLE 3

The process of Example 2 is repeated wtih the exception that the carrier fluid for the solid potassium chloride is a 30% potassium hydroxide solution containing 3,000 ppm of a partially hydrolyzed polyacrylamide. Good injectivity of the well is realized.

EXAMPLE 4

A stratified sandstone formation is comprised of substantially two different strata having substantially different permeabilities. One stratum is about 20 feet thick, has a permeability of about 50 md and a porosity of 15% while the other stratum has a permeability of about 5 md, is about 40 feet thick and has a porosity of about 10%. A 3 wt % aqueous KCl solution (the water is void of divalent cations) is injected into the well in a volume amount of 2,000 barrels. Thereafter, 100 pounds/porosity feet of dried KCl carried in a saturated potassium chloride solution is injected—20% of the KCl is larger than 35 mesh and 68% is larger than 60 mesh. Surface pressure of the well increases about 300 psi after injection of the dry potassium chloride. Thereafter, a 20% by weight of potassium hydroxide aqueous solution is injected, the volume amount of potassium hydroxide injected is about 315 barrels and the amount of KOH injected is about 5,000 pounds/porosity foot. The potassium hydroxide is displaced out into the formation by injecting fresh water into the well. Thereafter, the well is shut in for approximately 20 hours and is then returned to production. Increased injectivity of about 220 BWPD is realized. Before treatment, the well would not accept significant amounts of water.

What is claimed is:

1. A process of stabilizing clays in a water-sensitive, stratified subterranean sandstone formation containing migratable fine particles which interact with aqueous solutions having ionic makeup distinct from connate water to reduce permeability of the formation and flow of water therethrough, the formation being penetrated by a wellbore in fluid communication therewith and wherein the formation is composed of at least two different stratum having substantially different permeabilities and wherein an aqueous solution comprised of potassium hydroxide is contacted with the fine particles for a time sufficient to effectively render the fine particles relatively insensitive to the aqueous solution having an ionic makeup distinct from the connate water, the process comprising injecting sequentially:
   (a) an aqueous presoak solution containing about 0.1 to about 20 wt % of potassium chloride in a volume amount sufficient to displace divalent cations away from the formation to be treated and to cause the clays surrounding the wellbore to assume a smaller volume, the potassium chloride is solubilized in water that may contain salts that are non-damaging to the process and are compatible with the fine particles, (b) an effective amount of a solid potassium chloride into the formation to substantially reduce the permeability of the highly permeable stratum, the potassium chloride being dispersed in a carrier fluid substantially insoluble to the potassium chloride and containing less than 10 ppm of divalent cations, and (c) injecting the aqueous potassium hydroxide solution into the lesser permeable stratum to effect treatment of the formation with the aqueous potassium hydroxide solution.

2. The process of claim 1 wherein the carrier fluid is aqueous potassium chloride.

3. The process of claim 2 wherein the aqueous potassium chloride contains at least 20% by weight of potassium chloride.

4. The process of claim 1 wherein the carrier fluid is aqueous potassium hydroxide.

5. The process of claim 1 wherein about 100 to 10,000 pounds per porosity foot of the potassium chloride is injected into the formation before injection of the solid potassium chloride.

6. A process of stabilizing clays surrounding a wellbore in a water-sensitive, stratified subterranean sandstone formation containing migratable fine particles which interact with aqueous solutions having an ionic makeup distinct from connate water to reduce the permeability of the formation and flow of water therethrough and wherein the formation is comprised of at least a highly permeable stratum and a lesser permeable stratum, the formation being penetrated by a wellbore in fluid communication therewith, the process comprising injecting sequentially:

(a) an aqueous presoak solution containing about 0.1 to about 20 wt % of potassium chloride and less than about 10 ppm of divalent cations, the amount injected being sufficient to displace divalent cations away from the area surrounding the wellbore and to cause the clays surrounding the wellbore to assume a smaller volume, (b) an effective amount of a solid potassium chloride dispersed in a carrier fluid that is substantially inert to solubilization of the solid potassium chloride in the carrier fluid to substantially reduce the permeability of the highly permeable stratum to a permeability about equal to or less than that of the lesser permeable stratum, and (c) a sufficient amount of a potassium hydroxide solution containing at least about 15% by weight of potassium hydroxide to contact a substantial amount of the fine particles within a radius of up to about 25 feet from the wellbore and shutting in the well for a time sufficient to permit the potassium hydroxide to effectively render the fine particles relatively insensitive to an aqueous solution having an ionic makeup distinct from the connate water, and (d) thereafter returning the well to its normal operation.

7. The process of claim 6 wherein about 100 to about 10,000 pounds per vertical porosity foot of potassium chloride is injected into the formation prior to the injection of the solid potassium chloride.

8. The process of claim 6 wherein the carrier fluid is aqueous potassium chloride containing at least about 20 wt % of potassium chloride.

9. The process of claim 6 wherein the carrier fluid is aqueous potassium hydroxide containing potassium hydroxide in sufficient concentration to substantially render the solid potassium chloride insoluble in the potassium hydroxide solution.

10. The process of claim 6 wherein the well is shut in for approximately 4 to about 64 hours after injection of the aqueous potassium hydroxide solution.

11. The process of claim 6 wherein a displacing fluid is immediately injected into the well after injection of the aqueous potassium hydroxide solution to displace the potassium hydroxide out into the formation to a distance of at least about 5 feet.

12. The process of claim 11 wherein the displacing fluid is a weak inorganic acid.

13. The process of claim 6 wherein about 100 to about 100,000 pounds per porosity foot of potassium hydroxide is injected into the formation.

14. The process of claim 12 wherein the acid is hydrochloric acid.

15. The process of claim 6 wherein a cationic polyacrylamide is added to the carrier to agglomerate the solid potassium chloride.

16. The process of claim 6 wherein the solid potassium chloride has a particle size within the range of about 2 to about 20 Tyler Screen Mesh and about 20% of the particles will pass through a 30 Mesh and 50% will pass through a 50 Mesh.

17. The process of claim 16 wherein the particle size is about 10 to about 100 Mesh.

18. A process of stabilizing clays in a water-sensitive, stratified subterranean sandstone formation containing migratable fine particles which interact with aqueous solutions having an ionic makeup distinct from connate water to reduce the permeability of the formation and flow of water therethrough and wherein the formation is comprised of at least a highly permeable stratum and a lesser permeable stratum, the formation being penetrated by a wellbore in fluid communication therewith, the process comprising injecting sequentially:

(a) an aqueous presoak solution containing about 100 to about 10,000 pounds of potassium chloride per porosity foot and containing less than about 10 ppm of divalent cations, to displace divalent cations away from the wellbore and to cause the fine particles surrounding the wellbore to assume a smaller volume, (b) an effective amount of a solid potassium chloride dispersed in a carrier fluid that is substantially free of divalent cations and will not substantially solubilize the solid potassium chloride in the carrier fluid, to substantially reduce the permeability of the highly permeable stratum to a permeability about equal to or less than that of the average permeability of the lesser permeable stratum, and (c) a sufficient amount of a potassium hydroxide solution containing at least about 15% by weight of potassium hydroxide to contact a substantial amount of the fine particles for a time sufficient to effectively render the particles relatively insensitive to the aqueous solution having an ionic makeup distinct from the connate water, and (d) thereafter returning the well to its normal operation.

19. The process of claim 18 wherein the presoak solution containing about 1 to about 20 wt % of potassium chloride.

20. The process of claim 18 wherein the carrier fluid is aqueous potassium chloride containing at least about 20 wt % of potassium chloride and less than about 10 ppm of divalent cations.

21. The process of claim 18 wherein the carrier fluid is an aqueous potassium hydroxide solution containing less than about 10 ppm of divalent cations and the concentration of the potassium hydroxide is sufficient to substantially render the potassium hydroxide solution relatively insoluble to the solid potassium chloride.

22. The process of claim 18 wherein the well is shut in for approximately 4 to about 64 hours after injection of the aqueous potassium hydroxide solution.

23. The process of claim 18 wherein a displacing fluid is immediately injected into the well after injection of the aqueous potassium hydroxide solution to displace the potassium hydroxide out into the formation to a distance of at least about 5 feet.

24. The process of claim 18 wherein the displacing fluid is a weak inorganic acid.

25. The process of claim 18 wherein the particle size of the solid potassium chloride is within the range of about 2 to about 200 Tyler Screen Mesh and about 20% will pass through a 30 Mesh and 50% will pass through a 50 Mesh.

* * * * *

UNITED STATES PATENT AND TRADEMARK OFFICE
CERTIFICATE OF CORRECTION

PATENT NO. : 4,798,245
DATED : January 17, 1989
INVENTOR(S) : Jeffrey E. Frank

It is certified that error appears in the above-identified patent and that said Letters Patent is hereby corrected as shown below:

| | |
|---|---|
| Col. 2, line 36: | Delete "strate-the" and insert --strata - the--. |
| Col. 4, line 2: | Delete "doe" and insert --does--. |
| Col. 4, line 11: | Delete "saturaed" and insert --saturated--. |
| Col. 4, line 16: | Delete "hydoxide" and insert --hydroxide--. |
| Col. 4, lines 36-37: | Delete "Concentratins" and insert --Concentrations--. |
| Col. 6, line 44: | Delete "given" and insert --give--. |
| Col. 7, line 46: | After "hydroxide" insert --in the water is about 30% by weight. The potassium hydroxide--. |
| Col. 10, line 24: | Before "Tyler" delete "20" and insert --200--. |

Signed and Sealed this

First Day of August, 1989

Attest:

DONALD J. QUIGG

Attesting Officer

Commissioner of Patents and Trademarks